(Model.)
E. L. BURGOIN.
PIPE BENDER.
No. 406,992. Patented July 16, 1889.
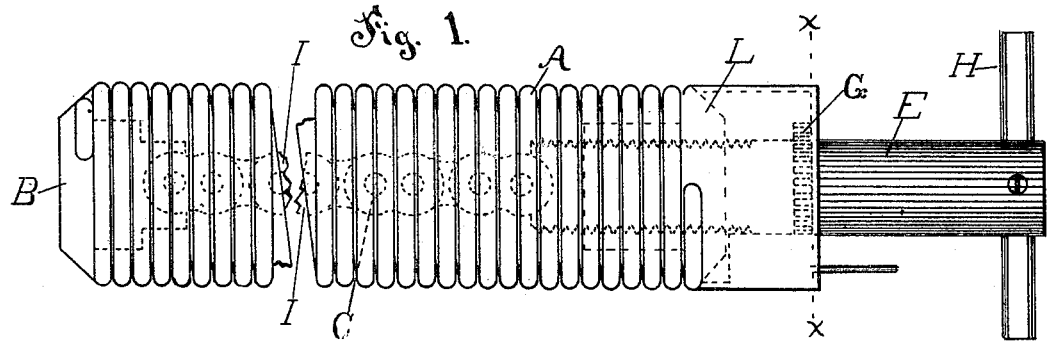
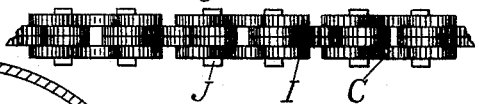
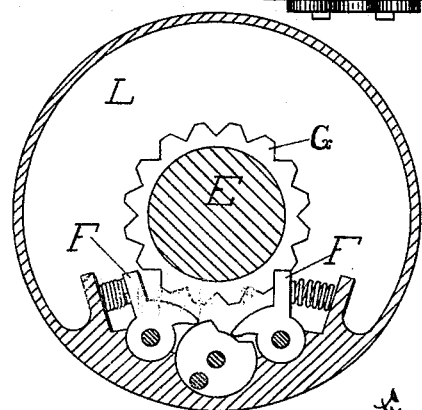
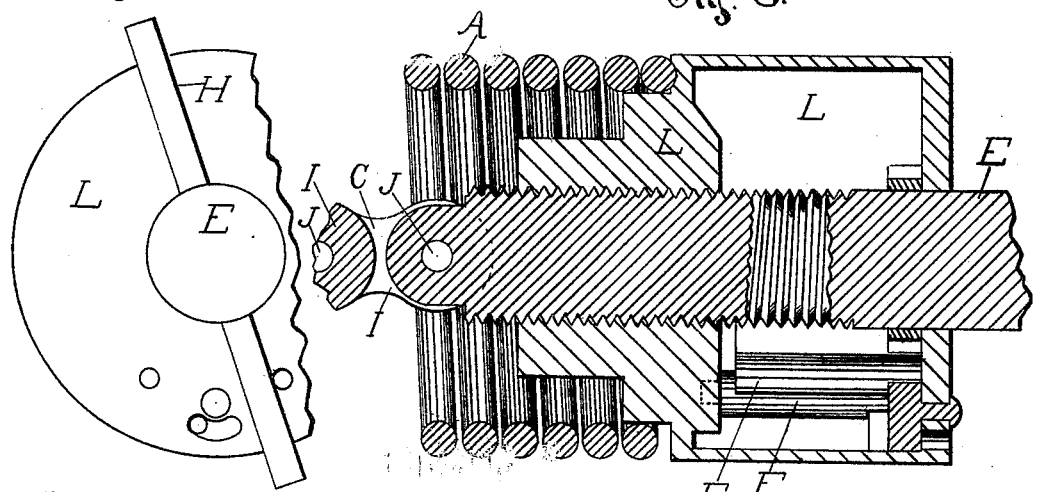
Witnesses
M. C. Galer
C. C. Conner
Inventor
Edward L. Burgoin
by Hazard & Townsend
his atty

UNITED STATES PATENT OFFICE.

EDWARD L. BURGOIN, OF LOS ANGELES, CALIFORNIA.

PIPE-BENDER.

SPECIFICATION forming part of Letters Patent No. 406,992, dated July 16, 1889.

Application filed January 18, 1889. Serial No. 296,718. (No model.)

*To all whom it may concern:*

Be it known that I, EDWARD L. BURGOIN, a citizen of the United States, residing at Los Angeles, in the county of Los Angeles and State of California, have invented a new and useful Improvement in Pipe-Benders, of which the following is a specification.

My invention relates to pipe-benders formed of a cylindrical spiral spring adapted to be inserted in the pipe to cause it to retain its cylindrical form while being bent.

The object of my invention is to make such spiral spring adjustable as to its diameter, so that when it is inserted into the pipe it can be expanded to press firmly against the walls of the pipe, and when the pipe is bent the spring can be contracted, so as to be easily withdrawn.

My invention comprises the combination, with the spring, of a flexible non-twistable connection fixed by one end to one end of the spring, and connected at the other end with the other end of the spring by means of a screw and ratchet, so that the connection can be revolved, and thus contract and expand the spring.

The drawings illustrate my invention.

Figure 1 is a perspective view of my improved pipe-bender, partly broken away to contract the view. The device for connecting the ends of the spring are shown in dotted lines. Fig. 2 is a transverse section to show the ratchet mechanism. Fig. 3 is an enlarged longitudinal section of the head having the ratchet-connection. A portion of the handle is shown complete to show the direction of the screw-threads. Fig. 4 is a broken view of the ratchet end of the pipe-bender. Fig. 5 is a detail of the flexible non-twistable connection.

The spiral spring A is fixed at one end to a head B, to which one end of the flexible non-twistable connection C is fixed. The other end of the spring is fixed to a head L, provided with a female screw, through which the cylindrical handle E, provided with a screw-thread corresponding in direction to the spiral of the spring, screws, so that when the handle is turned it will be driven axially through the head L by the screw-thread. The handle is attached to the flexible non-twistable connection C, so that when the head L is held stationary and the handle is turned to screw it through the head L the head B is revolved by the flexible connection, and the spring is expanded and contracted, respectively, as it is shortened or lengthened.

The ratchet G F, which serves to connect the head L and handle E, to allow the handle to turn within the head in the direction desired, and prevent it from turning in the opposite direction, is constructed in the manner of ordinary ratchets now in use in ratchet-tools, except that the dogs F are of such length as to allow for the play of the ratchet-wheel G as the handle screws back and forth in the head L.

In operating the tool one of the dogs is thrown to engage with the wheel G, as shown in Fig. 2, so that the handle can be turned in one direction to expand the spring, but will be held by the ratchet from turning in the other direction.

The construction, mode of operation, and purpose of the ratchet are analogous to that of ratchets in ordinary use in ratchet-tools, and I lay no claim to the ratchet as a part of my invention, except in combination with the other parts, and I do not wish in any way to be limited to the use of the exact form of ratchet shown.

The handle may be provided with the cross-bar H or other suitable means for turning it.

The flexible non-twistable connection C may be made of flat links I I, riveted together by rivets J, passing through the links laterally, so that the chain will bend in two directions, but cannot be twisted.

When it is desired to bend a pipe, the pipe-bender is inserted into the pipe, and the handle is turned until the spring is expanded to fit snugly against the inside of the pipe, and the pipe is then bent; then the ratchet is loosened and the spring allowed to resume its original position. If it is found necessary to reduce the size of the spring below that which it will assume by its own elasticity, this can be done by reversing the ratchet and turning the handle. This will be found convenient in cases where it is difficult to withdraw the pipe-bender after the bend has been made.

Now, having described my invention, what I claim as new, and desire to secure by Letters Patent, is—

1. In a spiral-spring pipe-bender, the combination, with the spring, of a flexible non-twistable connection fixed by one end to one end of the spring and connected at the other end with the other end of the spring by means of a ratchet.

2. The combination of the spiral spring fixed at one end to a head B, to which one end of the flexible non-twistable connection C is fixed, the head L, having the other end of the spring fixed thereto, the cylindrical handle E, attached to the connection C, and the ratchet connecting the head L and the handle.

3. The combination of the spiral spring A, fixed at one end to a head B, the flexible non-twistable connection fixed to the head B, the head L, provided with a female screw, the cylindrical handle E, provided with a screw-thread to screw therein and attached to the flexible non-twistable connection, and the ratchet connecting the handle and the head L.

EDWARD L. BURGOIN.

Witnesses:
JAMES R. TOWNSEND,
A. C. CAMER.